United States Patent

Break et al.

[11] Patent Number: 5,651,298
[45] Date of Patent: Jul. 29, 1997

[54] PORTABLE SAW TABLE

[75] Inventors: Douglas G. Break, Livonia; Arthur B. Chubb, Romulus; Daniel J. Spencer, Belleville; James E. Suyak, Lincoln Park, all of Mich.

[73] Assignee: Tapco Products Company, Inc., Plymouth, Mich.

[21] Appl. No.: 484,977

[22] Filed: Jun. 7, 1995

Related U.S. Application Data

[62] Division of Ser. No. 372,824, Jan. 13, 1995, abandoned, which is a continuation of Ser. No. 30,638, Mar. 12, 1993, abandoned, which is a continuation-in-part of Ser. No. 840,319, Feb. 24, 1992, abandoned.

[51] Int. Cl.$^6$ .................................................. B27B 5/20
[52] U.S. Cl. ................. 83/471.3; 83/477.1; 83/486.1; 83/574; 83/522.25; 83/699.51
[58] Field of Search .................... 83/471.3, 477.1, 83/486.1, 490, 574, 522.25, 581, 699.51

[56] References Cited

U.S. PATENT DOCUMENTS

| | | | |
|---|---|---|---|
| 2,589,554 | 3/1952 | Killian | 83/486.1 X |
| 2,632,483 | 3/1953 | Jamack | 83/486.1 X |
| 2,708,952 | 5/1955 | Blackwell | 83/477.1 X |
| 2,735,455 | 2/1956 | Forsberg | 83/486.1 X |
| 2,739,624 | 3/1956 | Haddock | 83/471 |
| 3,130,758 | 4/1964 | McKinley | 83/574 |
| 3,483,901 | 12/1969 | Ray | 83/471.3 |
| 3,821,918 | 7/1974 | Niehaus et al. | 83/471.3 |
| 4,016,649 | 4/1977 | Kloster | 30/373 |
| 4,079,648 | 3/1978 | Chappell | 83/490 |
| 4,155,383 | 5/1979 | Welliver | 144/253.1 |
| 4,197,775 | 4/1980 | Handler et al. | 83/471.3 |
| 4,452,117 | 6/1984 | Brickner et al. | 83/468 |
| 4,516,453 | 5/1985 | Parham, Jr. | 83/471.3 |
| 4,608,761 | 9/1986 | Small | 83/522.25 X |
| 4,807,506 | 2/1989 | Audet | 83/471.3 X |
| 4,995,288 | 2/1991 | DellaPolla | 83/574 |

*Primary Examiner*—Rinaldi I. Rada
*Assistant Examiner*—Raymond D. Woods
*Attorney, Agent, or Firm*—Barnes, Kisselle, Raisch, Choate, Whittemore & Hulbert, P.C.

[57] ABSTRACT

A portable saw table comprising a saw track pivotally supported on a saw table. An improved lightweight plastic protractor and indexer plate are rotatably mounted with respect to each other by an improved pivot mount. The pivot mount comprises a plurality of lobes received in a complementary recess in the indexer plate in a spline-like engagement providing strength and rigidity to prevent flexing to ensure accurate pivotal movement. The improved protractor is guided by a gib mounted on the indexer plate for smooth pivotal movement. The plastic protractor includes indicia to indicate the degree of angular movement and the plastic indexer plate includes a window for viewing the indicia. In one form, the protractor has an angled portion with indicia and the indexer plate has an angled magnifying sight lens for easy viewing of the adjustment angle. A hollow material stop is provided to accommodate workpieces of varying thickness. U-brackets hold the saw shoe plate to the saw slide and a spring loaded saw stop prevents the saw slide from sliding past the ends of the saw tracks. Additionally, an adjustable leg assembly is provided for adjusting the height of the saw table and is removable therefrom.

32 Claims, 13 Drawing Sheets

PORTABLE SAW TABLE

This is a divisional of application Ser. No. 08/372,824 filed on Jan. 13, 1995 abandoned, which is a continuation of Ser. No. 08/030,638 filed Mar. 12, 1993, abandoned, which is a continuation-in-part of Ser. No. 07/840,319 filed Feb. 24, 1992 abandoned.

BACKGROUND OF THE INVENTION

Portable saw tables are commonly used at building sites. Typical patents showing portable saw tables are U.S. Pat. Nos. 3,821,918, 4,452,117 and 4,197,775.

A portable saw table of the type shown in the aforementioned application Ser. No. 840,319, is provided wherein a portable saw table is provided which utilizes a standard power tool such as a saw; in which a protractor is mounted on the saw track to pivot therewith and an indexer plate is mounted on the saw table whereby a wider range of angles between the saw table and saw track can be obtained to provide a wider range of angular positions than has heretofore thought to be possible; and which can be positioned to operate in two positions at a right angle to one another.

It is therefore a general object of the invention to provide a portable saw table having an improved lightweight plastic protractor and indexer plate for indicating the degree of rotational adjustment, where the plastic protractor is mounted for pivotal movement with respect to the indexer plate by a novel plastic pivot mount providing strength and rigidity to the pivotal connection, that provides means to support and smoothly guide the protractor as it rotates with respect to the indexer plate, that provides means to accommodate workpieces of varying thickness and that provides an adjustable leg assembly to adjust the height of the saw table and is removable therefrom, so that the saw table can be easily assembled and disassembled to be readily transported to and from a job site.

SUMMARY OF THE INVENTION

In accordance with the present invention, a new plastic protractor and indexer plate is provided. The protractor and indexer plate are made of plastic and comprise web sections for added strength. The protractor has indicia to indicate the degree of adjustment and the indexer plate has a window for viewing the indicia. The protractor may have angled indicia and the indexer may have an angled magnifying sight lens for easier viewing. An improved plastic pivot mount supports the protractor for rotational movement. The improved pivot mount comprises lobes that are received in a complementary recess in the plastic indexer plate in a spline-like engagement to provide strength and rigidity and to prevent flexing to ensure accurate pivotal movement. A gib is provided on the indexer plate for insuring smooth and pivotal movement. The gib is mounted about the periphery of the indexer plate to provide a bearing surface over which the protractor glides as it rotates to provide support to the protractor and to provide smooth movement. A hollow material stop is provided for attachment to the portable saw table for accommodating workpieces of varying thickness. A U-bracket for holding the saw shoe plate to the saw slide and a spring loaded saw stop to prevent the saw shoe plate from sliding past the ends of the saw tracks are provided. Adjustable legs are provided for the portable saw table to provide adjustable yet steady support thereto.

The invention provides for greater flexibility in cutting operations by the novel pivotal mounting of the saw track to the saw table. The saw track is pivotally mounted with a protractor indicating the degree of movement and adjustable stops allowing for one hand adjustment operations. The invention also provides for an adjustable work table surface which has an adjustable table width for accommodating materials up to fifty two inches wide and extensions for extra table length to hold long material up to five feet on both sides of the table.

DETAILED DESCRIPTION OF THE INVENTION

Figure 1:
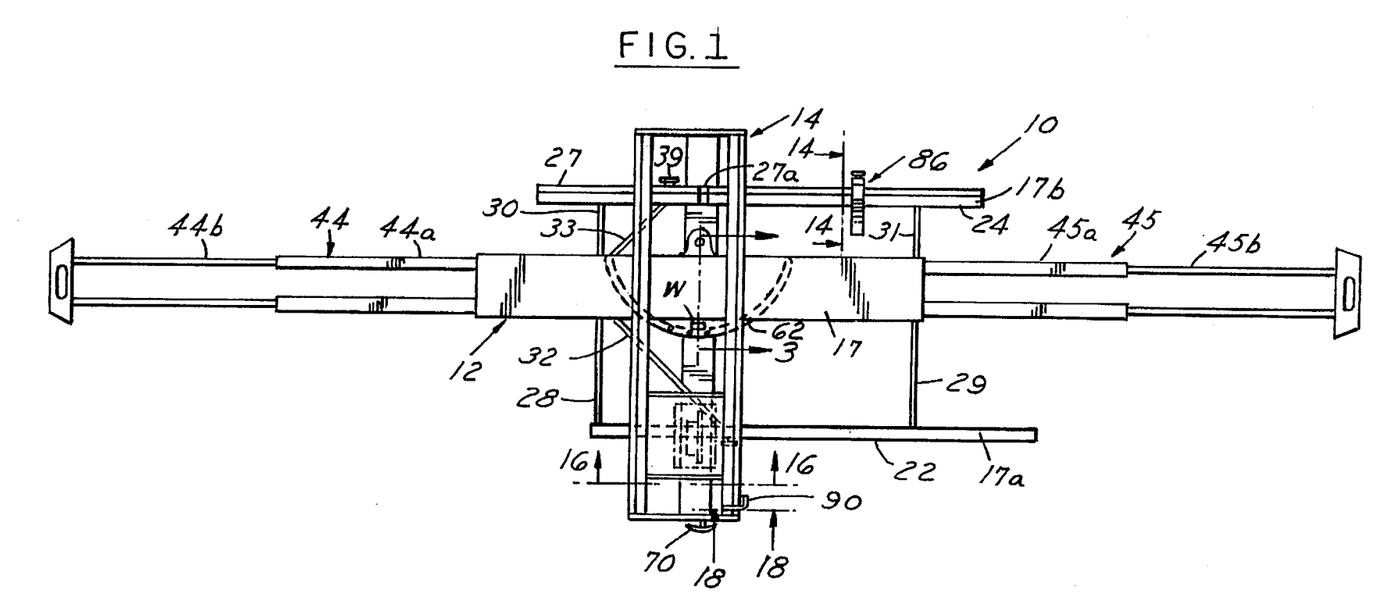
FIG. 1 is a plan view of the saw table with full extensions in accordance with the present invention.

Referring to FIG. 1, the invention comprises a saw table 10 which includes an expandable saw table base 12 and a saw track 14 mounted for pivotable movement thereon.

Figure 3:
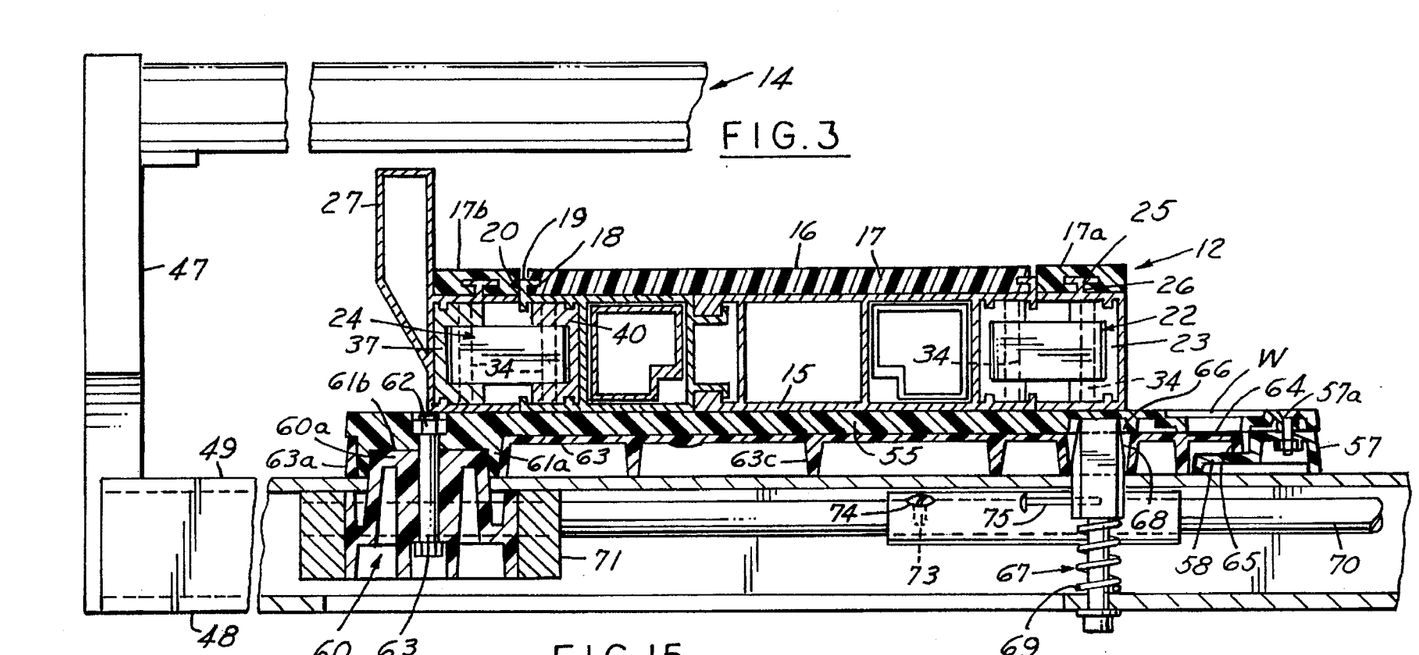
FIG. 3 is a sectional view taken through line 3—3 of FIG. 1.

Referring to FIG. 3, it can be seen that the table base 12 includes a base member 15 supporting a work table 17 having a flat upper surface 16. The work table 17 is preferably made of plastic such as vinyl and has grooves 18 formed along the sides thereof to accommodate a flange 19 of an L-shaped extension 20 on the base member 15. The vinyl work table 17 is removable from the base member 15 by simply sliding across the base member 15 past the end of the extensions 20 and may be turned upside down and reinserted to present a clear or unmarred surface upon which to place a workpiece.

The saw table base 12 includes front and back extensions 22, 24. Front extension 22 has a supplemental plastic work surface 17a having a T-shaped groove 25 for accommodating a complementary T-shaped member 26 on the front extension 22. Similarly, back extension 24 has a supplemental plastic work surface 17b mounted thereon in a like manner. Back extension 24 additionally has an upper extension 27 which serves as a fence for limiting lateral movement of a workpiece. The extension 27 has an opening 27a to allow for passage of the saw blade.

Figure 20:
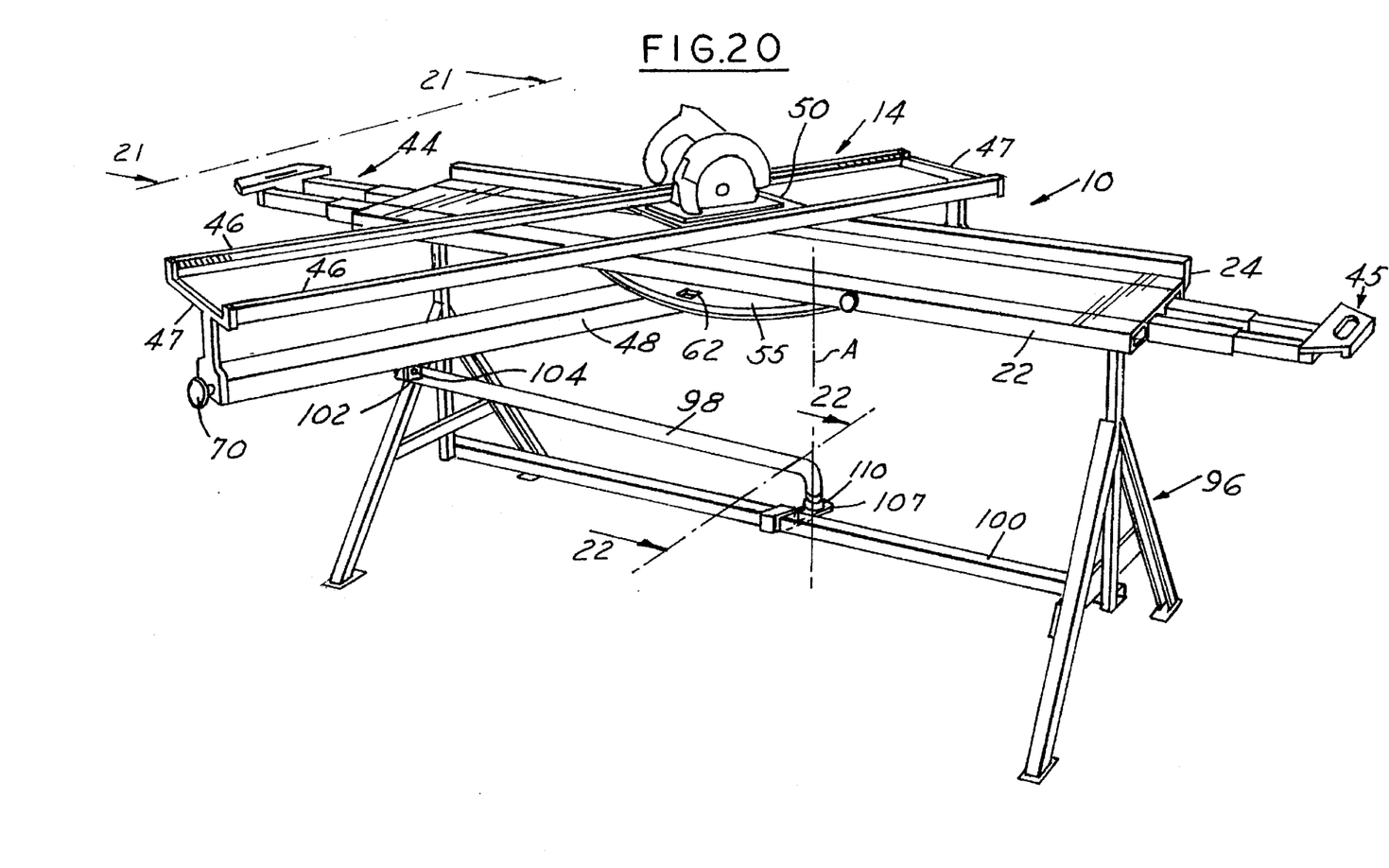
FIG. 20 is a perspective view of the table saw according to the present invention with the saw track in a pivoted position and with extensions of the saw table substantially retracted.
Figure 21:
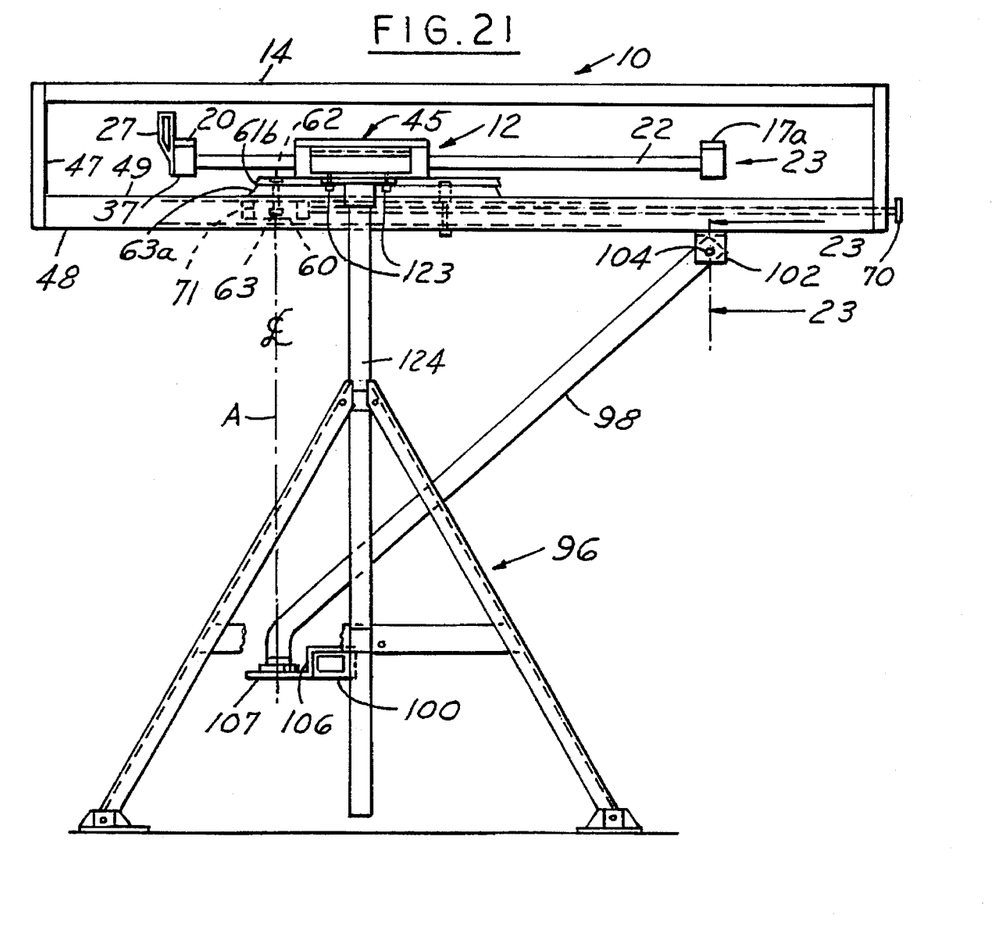
FIG. 21 is a view taken substantially along line 21—21 of FIG. 20.

Adjustability of the table width is accomplished through a system of parallel links that include a pair of front support arms 28, 29 (FIG. 1) and a front locking arm 32 pivotally connected to the front extension 22 and to the base member 15 to allow the front extension 22 to be swung from the retracted position of FIG. 20 to the extended position of FIG. 1. The back extension 24 is similarly mounted by a pair of back support arms 30, 31 and a back locking arm 33.

As the front and back extensions 22, 24 are swung from the retracted to the extended position, front and back support arms 28–31 swing about their respective fixed pivots defined by pivot pins 34 (FIG. 3). However, front and back locking arms 32, 33 are connected to the front and back extensions 22, 24 to slide with respect thereto. The front locking arm 32 is connected to the base member 15 at one end by fixed pivot 34 and is connected to the front extension 22 through a pivot shoe 23 adapted to slide within the front extension 22. When in the retracted position of FIG. 20 the front extension 22 may be secured by locking knob 43 similar to locking knob 39 discussed below.

The back locking arm operates in a similar manner and is connected to the back extension 24 and the base member 15. One end of the back locking arm 33 is fixed to the base member to pivot about pivot pin 34 held in a substantially C-shaped pivot pin block 40. The opposite end of the back locking arm 33 is mounted within the C-shaped portion of the back extension 24 through a pivot pin 34 mounted in a pivot shoe 37 adapted to slide along the back extension 24. The back extension 24 is locked in place by locking knob 39 (FIG. 1).

Referring to FIG. 1, the table length may be expanded by telescopic extensions 44, 45. The extensions 44, 45 are preferably made of telescoping extrusions 44a, 44b and 45a, 45b, the innermost extensions 44a, 44b being telescoped in the table base 12 which is also preferably extruded and are accommodated within the housing as seen most clearly in FIG. 3.

Figures 16, 17:
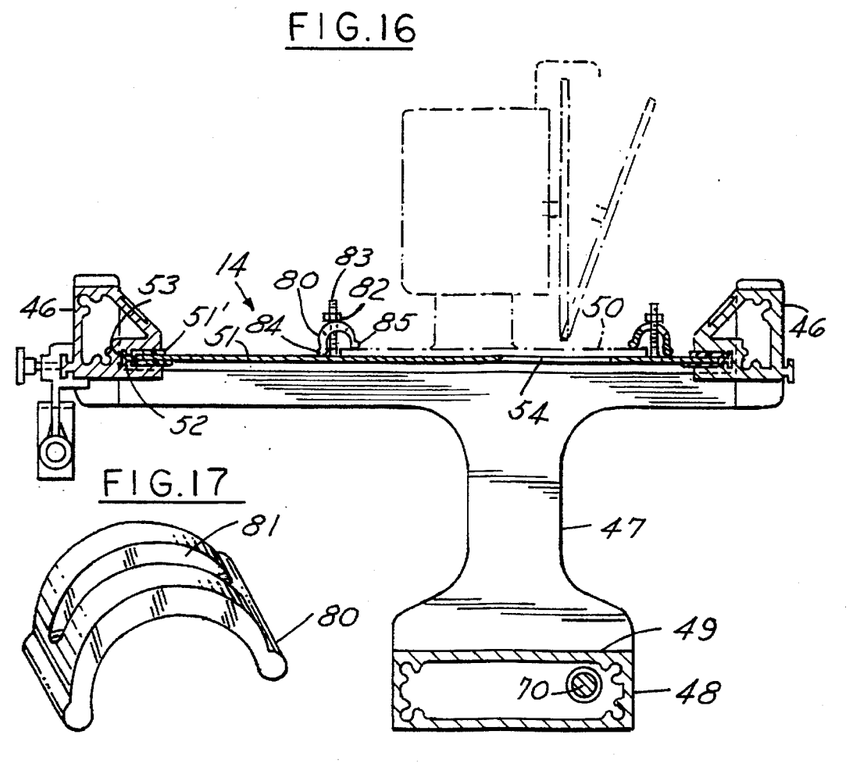
FIG. 16 is a cross sectional view taken substantially along line 16—16 of PIG. 1.
FIG. 17 is a perspective view of the U-bracket.

The saw track 14, seen most clearly in FIGS. 3 and 16, includes a pair of tracks 46 mounted at each end by a substantially T-shaped track support 47. A hollow track base 48 is connected to and extends between the bottom of the track supports 47 and has an upper flat surface 49. The saw, seen in phantom in FIG. 16, is fixedly mounted to the saw slide 51 by saw shoe plate 50. The saw slide 51 is slidable along the tracks 46 by a C-shaped vinyl guides 51' mounted within the tracks 46. The guides 51' have a T-shaped extension 52 receivable in a complementary groove 53 in the tracks 46. The saw slide 51 also has a groove 54 to accommodate the saw blade during the cutting operation as is well known. During operation, the saw is guided along the tracks 46 by the saw slide 51 moving within guides 51'. If desired, the saw slide 51 may be removable from the tracks by sliding the saw slide 51 past the ends thereof, turning the slide 90° and reinserting it in the track to perform a rip-cutting operation.

The aforementioned construction is identical to that of the aforementioned U.S. application Ser. No. 840,319.

Figures 4, 7:
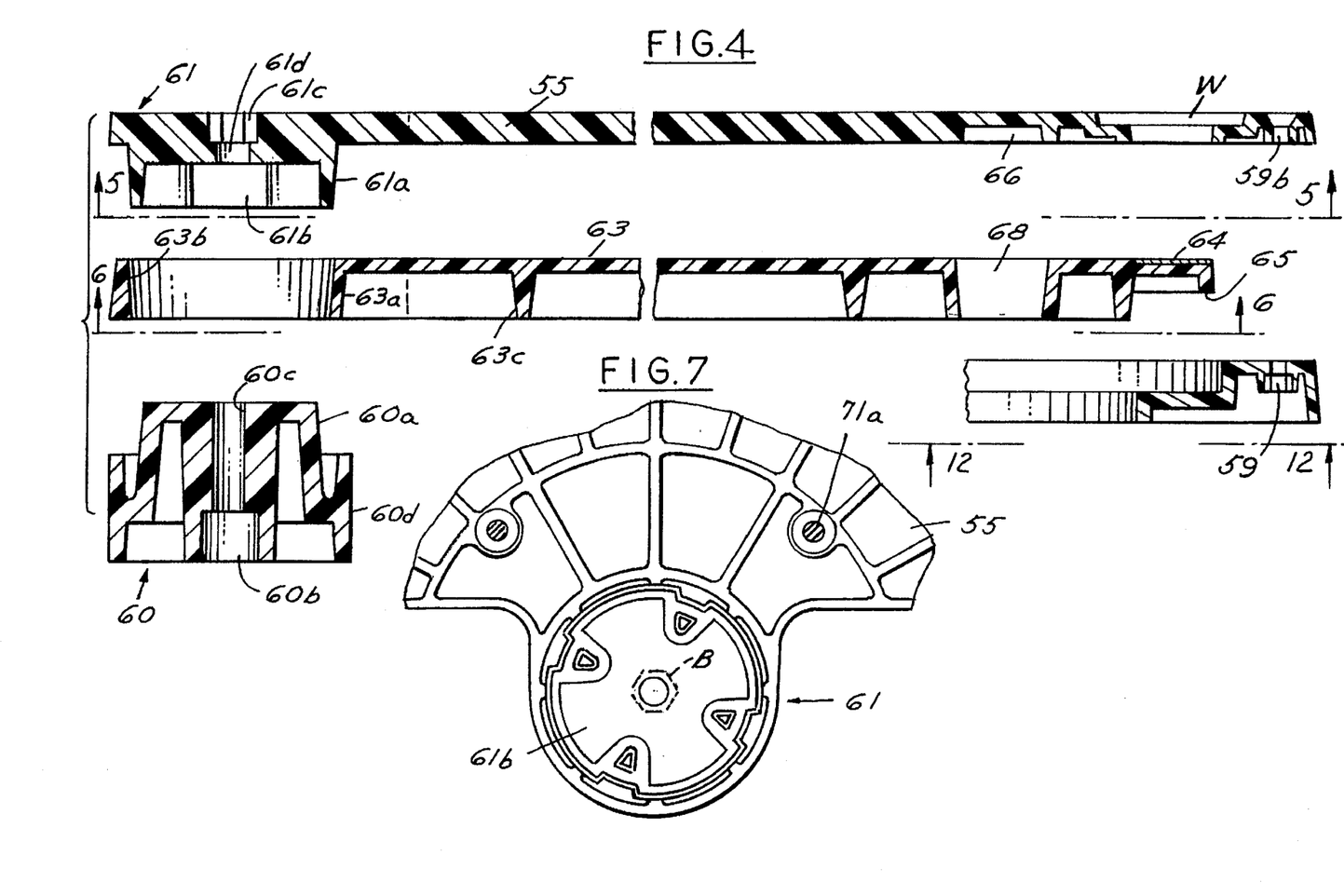
FIG. 4 is an exploded sectional view of the protractor and indexer plate assembly.
FIG. 7 is an enlarged broken bottom view of the rear mounting portion of the indexer plate.
Figure 5:
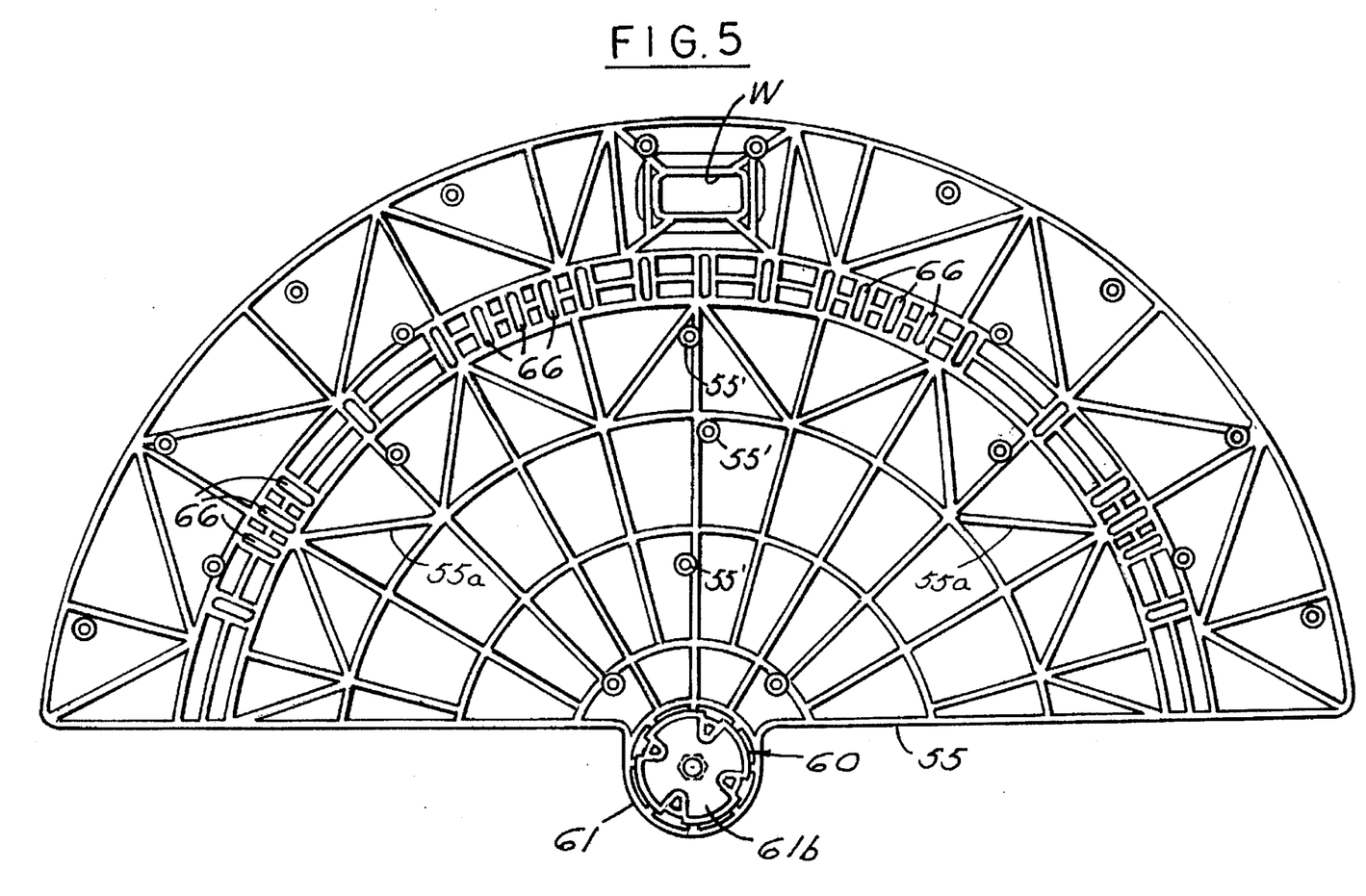
FIG. 5 is a bottom view of the indexer plate as viewed along 5—5 of FIG. 4.
Figure 6:
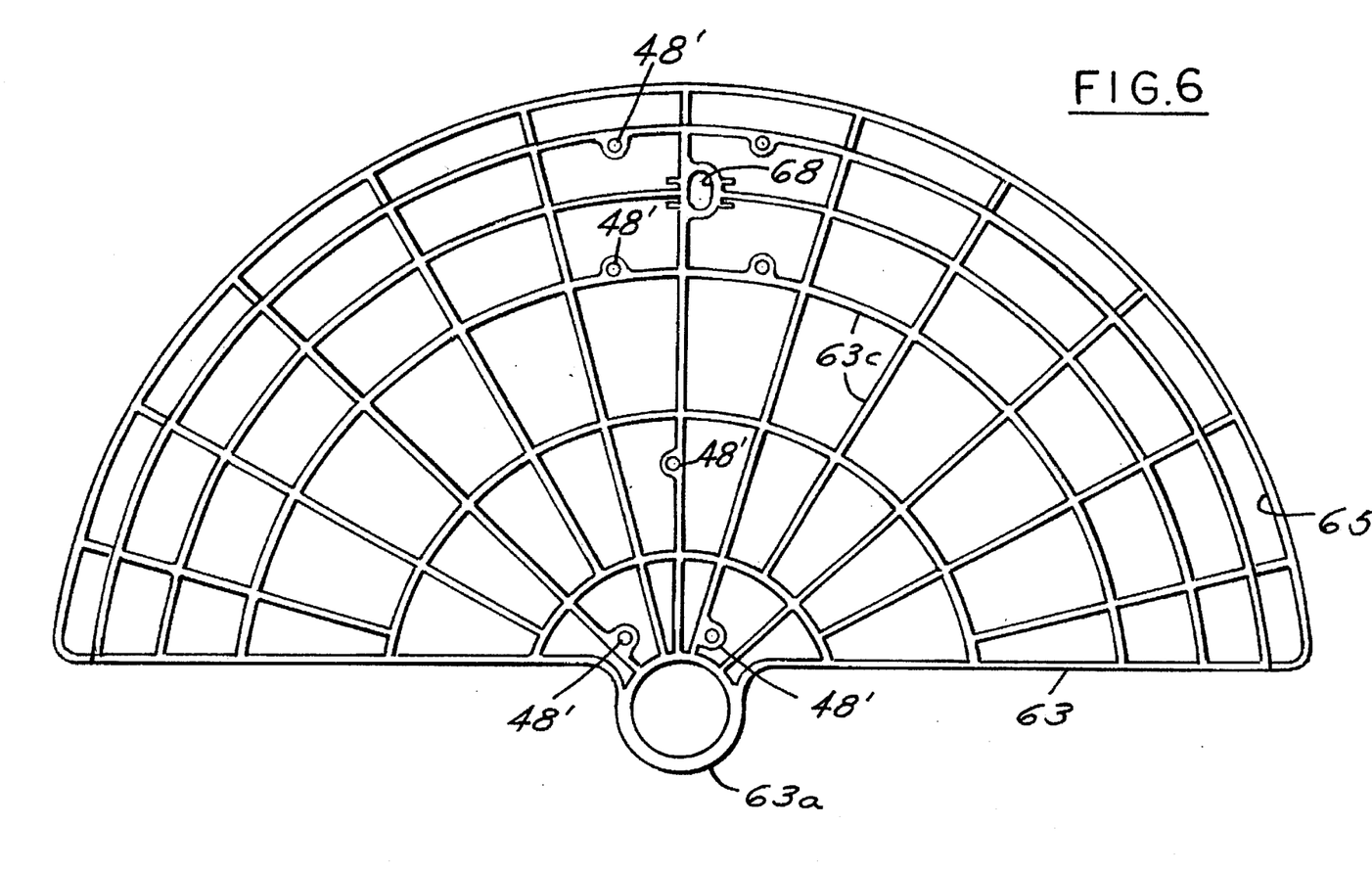
FIG. 6 is a bottom view of the protractor as viewed along line 6—6 of FIG. 4.
Figures 8, 9, 11:
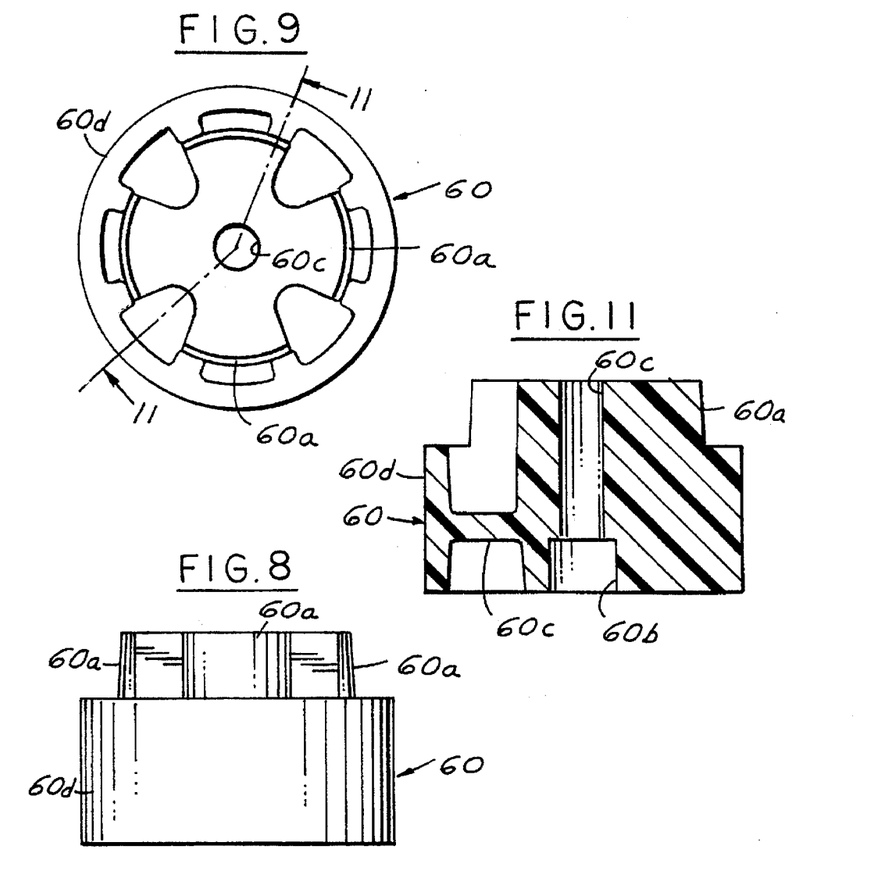
FIG. 8 is a front view of the pivot mount.
FIG. 9 is a plan view of the pivot mount.
FIG. 11 is a sectional view of the pivot mount taken along line 11—11 of FIG. 9.
Figure 10:
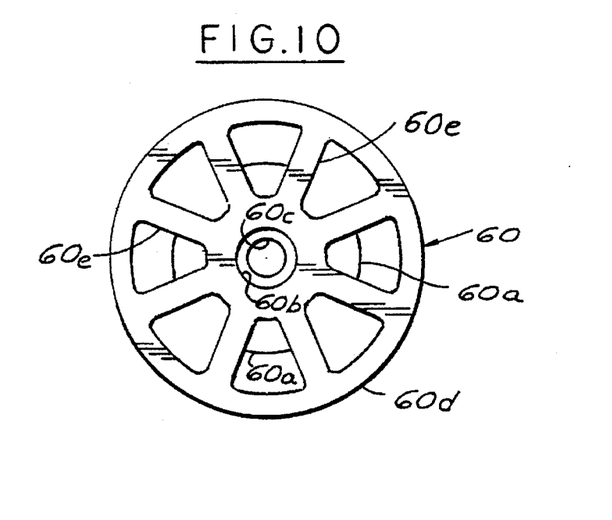
FIG. 10 is a bottom view of the pivot mount.

In accordance with the invention, the saw track 14 with a plastic protractor 63 fixed thereto is pivotally mounted on the table base 12 having a plastic indexer plate 55 fixed thereto by a novel plastic pivot arrangement as seen most clearly in FIGS. 3 and 4. The plastic indexer plate 55 is fixedly mounted on the bottom of the table 12 by fasteners such as screws extending through openings 55' (FIG. 5). The plastic protractor 63 is fixedly connected to the flat surface 49 of the track base 48 by fasteners such as screws extending through openings 48' in the protractor 63 (FIG. 6). The protractor 63 has a flat upper surface, an arcuate peripheral edge, and intersecting web sections 63c extending from the bottom surface to provide strength and support for the protractor 63 upon track base 48. A novel pivot mount 60 interconnects the indexer plate 55 and protractor 63 for relative pivotal rotation. The indexer plate 55 has an arcuate edge which overlies the arcuate edge of the protractor to be substantially adjacent thereto. The indexer plate 55 also has web sections 55a and a rear central mount 61. The mount 61 includes a hub portion 61a with a recess 61b. A recess 61c having a hexagonal cross section with a circular through opening 61d (FIG. 4) are provided in the mount 61. The hub portion 61a and recess 61b preferably have a conical shape tapering oppositely. The protractor 63 includes a central rear mounting portion 63a. Mounting portion 63a has a conical through bore 63b that receives hub portion 61a to be rotatable relative thereto.

The indexer plate 55 receives and is secured to pivot mount 60. This connection is located adjacent the opening 27a in the upper extension 27 of back extension 24 as seen best in FIG. 1. The opening 27a allows for passage of the saw blade through the upper extension 27 through all angles of adjustment. When the portable saw is in the cross-cutting position, the saw blade B is perpendicular to the longitudinal axis of the table and lies in a plane that intersects the pivot axis of pivot mount 60. Thus, the location of the opening 27a adjacent the pivot axis of the pivot mount 60 allows the width of the opening 27a to be limited so as just to allow passage of the saw blade B.

Pivot mount 60 (FIGS. 8–11) is a molded plastic piece and comprises a hub having plurality of upper lobes 60a with sides that taper slightly outwardly from the top and a lower skirt 60d. A preferable embodiment has four lobes 60a as seen in the figures. Walls 60e connect the skirt 60d to the central portion of the pivot mount 60 to provide a lightweight member while solid lobes 60a provide strength. The recess 61b in the indexer plate 55 is shaped to receive lobes 60a in a spline-like engagement. The indexer plate 55 and pivot mount 60 are secured by a hex nut and bolt arrangement 62, 63 (FIG. 3). The pivot mount 60 has a counterbore 60b and a through hole 60c. A hex nut 62 is placed in recess 61c and bolt 63 is inserted through counterbore 60b and opening 60c. The recess 61c secures the hex nut 62 as the bolt 63 is tightened. This eliminates the need for a wrench to hold the hex nut and allows for one handed operation to secure the indexer plate 55 to pivot mount 60.

As seen in FIG. 3, pivot mount 60 is inserted within an opening in the hollow track base 48 such that lobes 60a extend above the flat surface 49. The skirt 60d abuts the lower surface thereof but is rotatable relative thereto. Hub portion 61a of indexer plate 55 is captured between lobes 60a of pivot mount 60 and mounting portion 63a of protractor 63. Thus, indexer plate 55 is non-rotatably secured to pivot mount 60 as the protractor 63 and track base rotate about the hub portion 61a.

Figure 15:
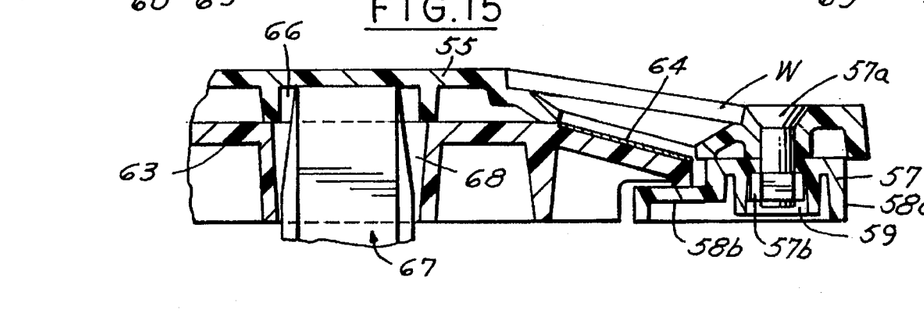
FIG. 15 is an enlarged partial sectional view of a different embodiment of the protractor and indexer plate.

The protractor 63 has indicia 64 about the outer periphery thereof to indicate the degree of angular movement. The indexer plate 55 has a window W at a central location adjacent the periphery thereof. The window W allows the operator to view the angle at which the saw table has been rotated. FIG. 3 shows one embodiment of the window W and indicia 64 being on a flat surface. A preferred embodiment is seen in FIG. 15 where the window W and indicia 64 are angled to allow easier viewing. The window W may additionally be of magnifying material to further enhance viewing.

Figures 12, 13, 14:
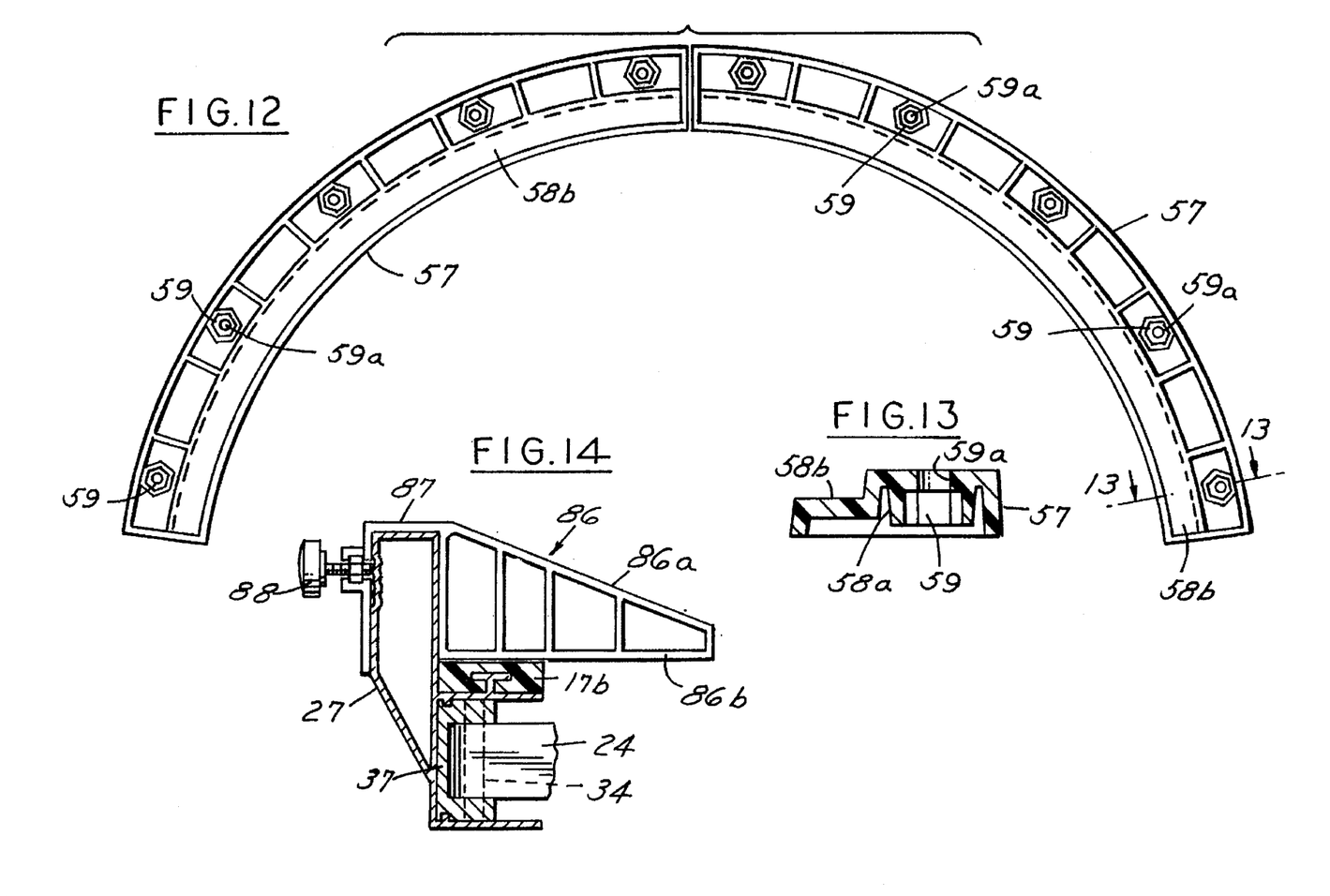
FIG. 12 is a bottom view of the gib taken along line 12—12 of FIG. 4.
FIG. 13 is a sectional view of the gib taken along line 13—13 of FIG. 12.
FIG. 14 is a partial sectional view of the hollow back stop.

To ensure smooth movement of the protractor 63 as well as to provide support, a gib 57 is mounted about the peripheral edge of the indexer plate 55. The gib 57 comprises two sections (FIG. 12). Each section is identical and may be reversed with the other. As seen most clearly in FIGS. 12 and 13, the gib 57 has a mounting section 58a with a recess 59 having a hexagonal cross section to receive and secure hex nut 57b (FIG. 15). Screw fastener 57a extends through hole 59b in the indexer plate 55 and hole 59a in the gib 57 and is threaded to hex nut 57b. The gib has an extension 58b providing a bearing surface over which a bottom face web 65 on the protractor 63 moves as the protractor rotates.

Figure 2:
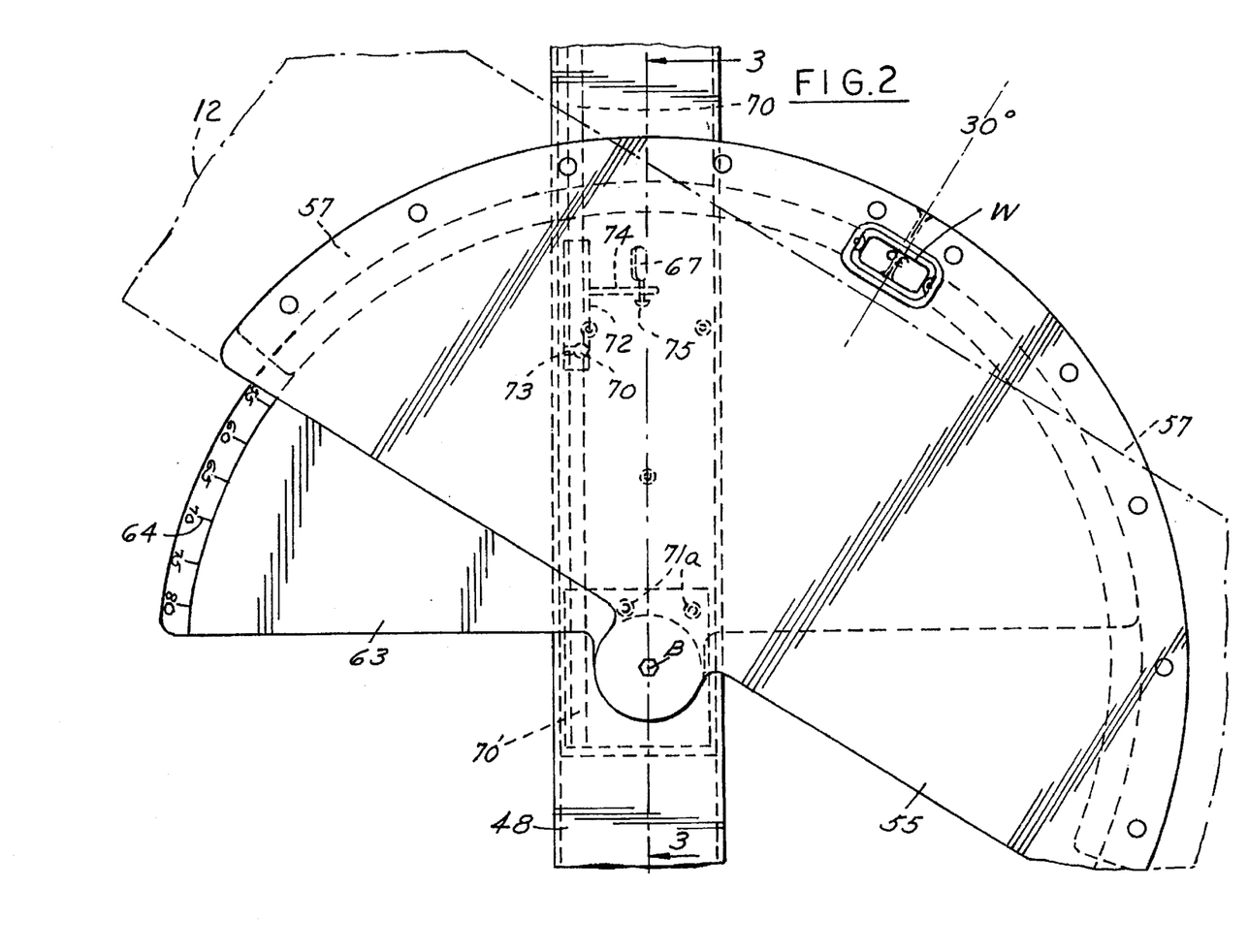
FIG. 2 is a partial view of the protractor and indexer plate in an adjusted angular position.

In order to lock the saw track 14 in any desired angle, a position stop is provided which will now be described with reference to FIGS. 3 and 15. A plurality of selected spaced openings 66 are provided on the underside of the indexer plate 55 and a single opening 68 is provided in the protractor 63. A stop member 67 is spring mounted on the base 48 by spring 69. The spring 69 urges the stop member upwardly through an opening in the track base 48 to be normally received within opening 68 in the protractor 63 and one of the openings 66 in the indexer plate 55 when aligned. A control handle or locking rod 70 is rotatably mounted within the track base 48 with a threaded end 70' (FIG. 2) received in a threaded opening within a radially split mounting block 71. The mounting block 71 surrounds the pivot mount 60 and is secured to the track base 48 by fasteners 71a (FIG. 2). The mounting block is mounted about the pivot mount 60 to be rotatable thereabout with the track base 48. The locking rod 70 includes a screw 70' and is received within a locking rod sleeve 72 having a radial slot 73 cut at one end thereof. The screw 70' is positioned within the radial slot 73. An extension member 74 is connected to the locking rod sleeve 72. The stop member 67 includes a projection 75 such as a screw and extends beneath the extension 74.

In order to rotate the saw track 14 to the desired angle, locking rod 70 is rotated in a counterclockwise direction until the screw 70' engages the end of the radial slot 73. Upon continued rotation of the locking rod 70, extension 74 engages projection 75 of the stop 67 and moves the stop against the spring 69 and out of engagement with openings 66, 68. The saw track 14 is then pivoted to the desired position where openings 66 and 68 are in alignment. The locking rod 70 is then rotated clockwise raising extension 74 out of engagement with projection 75 so that the stop 67 is urged upwardly by spring 69 into engagement with holes 66, 68 to lock the saw track 14 in place.

As seen in FIGS. 2 and 3, the window W allows the user to view the indicia 64 on the protractor 63 to determine the angle of movement.

If it is desired to lock the saw track in an uncommon angle, i.e. at a position where there are no openings 66 in the indexer plate 55, the locking rod 70 is further rotated clockwise so that the threaded end thereof tightens the radial split 70a in the mounting block 71 about the pivot mount 60. This frictionally holds the mounting block 71 against rotation about the pivot mount and thus lock the saw track 14 in position.

In accordance with another feature of the invention, an extruded material stop 86 (FIG. 14) is provided to form a stop abutment for the workpiece. A back bracket portion 87 fits onto extension 27 and is secured thereto by threaded knob 88. The material stop 86 has a sloping upper surface 86a and an abutment face 86b to accommodate workpieces of varying thickness. The material stop 86 also provides an abutment when workpieces are stacked together at varying heights. Preferably, the material stop extends at least 4 inches from the extension 27 across the work table 17 to accommodate a wide range of the workpiece widths.

In accordance with yet another feature of the invention, referring to FIGS. 16 and 17, it can be seen that U-brackets 80 are provided to secure the saw shoe plate 50 on the saw slide 51. The U-brackets 80 have an arcuate slot 81 for accommodating a nut and bolt arrangement 82, 83 connected to saw slide 51. The U-brackets 80 provide for varying thicknesses of different saw shoe plates. Thus, it can be seen that when it is desired to reposition or change saw shoe plates, all that is required is that nut 83 be untightened to loosen the U-bracket 80 which remains captured on the bolt 82. Bolt 82 will simply slide along the arcuate slot 81. After the saw shoe plate is in place, the U-brackets 80 are simply positioned to where an end 85 contacts the shoe plate and nut 83 is tightened to secure the U-brackets and thus the saw shoe plate in place.

Figure 18:
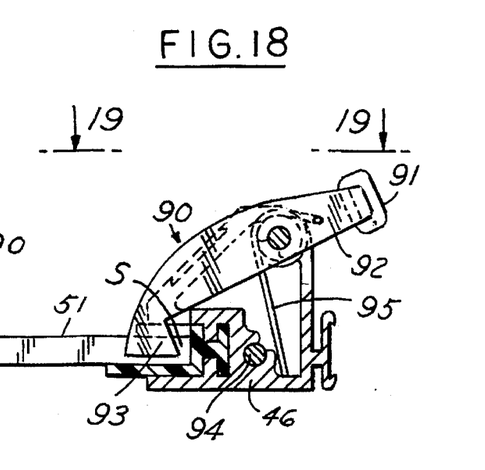
FIG. 18 is a partial sectional view of the saw stop device.
Figure 19:
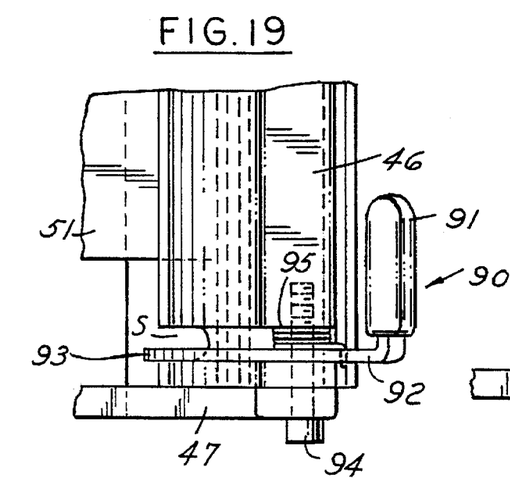
FIG. 19 is a view taken substantially along line 19—19 of FIG. 18.

Another feature of the invention is a spring loaded saw stop 90 as seen in FIGS. 18 and 19 to prevent the saw slide 51 and thus the saw from sliding past the forward end of the saw tracks 46. The forward end of the saw tracks is the end toward the bottom of FIG. 1. The saw stop 90 comprises a handle 91, leg 92 and stop foot 93 spring mounted on a threaded member 94 by spring 95. The saw stop is mounted within a slit S in the saw track 46 and is biased by spring 95 such that the stop foot 93 is in the travel path of the saw slide 51. When it is desired to remove the saw slide 51, the handle 91 is moved downward against the bias of the spring 95 to lift the stop foot 93 out of the travel path of the saw slide 51 and the saw slide can be removed.

Figure 23:
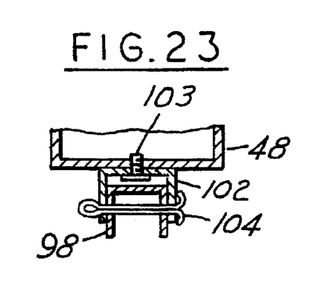
FIG. 23 is a view taken substantially along line 23—23 of FIG. 22.

Yet another feature of the invention is an adjustable leg support assembly 96 as seen in FIG. 20 with the saw table 10. Preferably, a leg support assembly 96 is provided at each end of the saw table. A brace 98 supports the saw track base 48 at one end and is pivotally supported at the other end to a cross strut 100 connect to an extending between each leg support assembly 96. The brace 98 is removably connected to track base 48 by a U-shaped bracket 102 (FIG. 23). The bracket 102 is attached to the track base 48 by a fastener 103. A pull pin 104 extends through openings in the sides of the bracket 102 and through an opening in brace 98 to connect the brace 98 thereto. To disassemble the track base 48 from the brace 98, pull pin 104 is simply removed to release the end of the brace 98 from the bracket 102.

Figure 22:
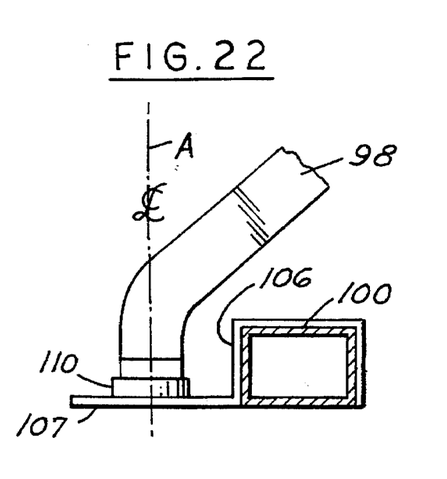
FIG. 22 is a view taken substantially along line 22—22 of FIG. 21.

The opposite end of the brace 98 is rotatably supported by bracket 106 (FIG. 22). Bracket 106 is a channel shaped member with an extension 107. The bracket 106 is fitted over the cross strut 100 to rest thereon. A plug 110 is secured to extension 107 and is received within the hollow brace 98. The brace 98 rotates about plug 110 as the saw table rotates. The axis A of rotation about the plug 110 must align with the pivot axis B (FIG. 2) of the protractor 63.

The leg assembly 120 (FIGS. 24–26) of the support assembly are adjustable to vary the height of the saw table. An attachment plate 122 is removably attached to the underside of the saw table base 12 by any means such as screws 123. A vertical support 124 has a plurality of openings 126 along the length thereof. The channel shaped legs 128 are hingedly connected to the vertical support 124 by horizontal braces 130. The braces 130 are pivotally connected to the support 124 by a bottom clevis 132 fixed thereto. Pivot pins 133 connect one end of the brace 130 to the clevis 132. The other end of the brace 130 is connected to the legs 128 by pivot pins 134. The upper ends of the legs are pivotally connected to the support 124 by an upper clevis 136 through pivot pins 137. The upper clevis 136 has an opening 138 that receives a pin 139 when aligned with one of the openings 126 to lock the support 124 and thus the saw table at the adjusted height.

Figure 24:
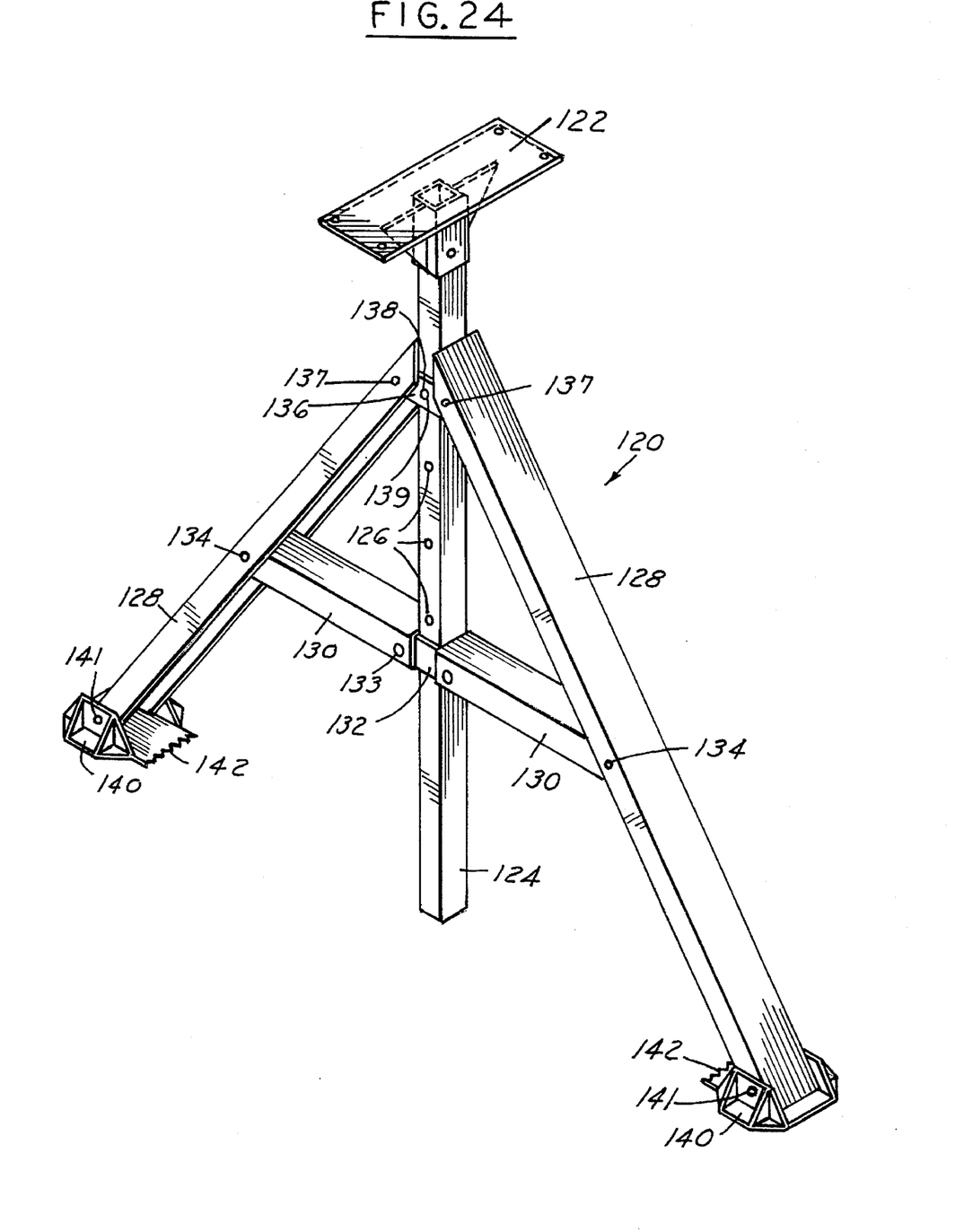
FIG. 24 is a perspective view of the adjustable leg assembly.
Figures 25, 26:
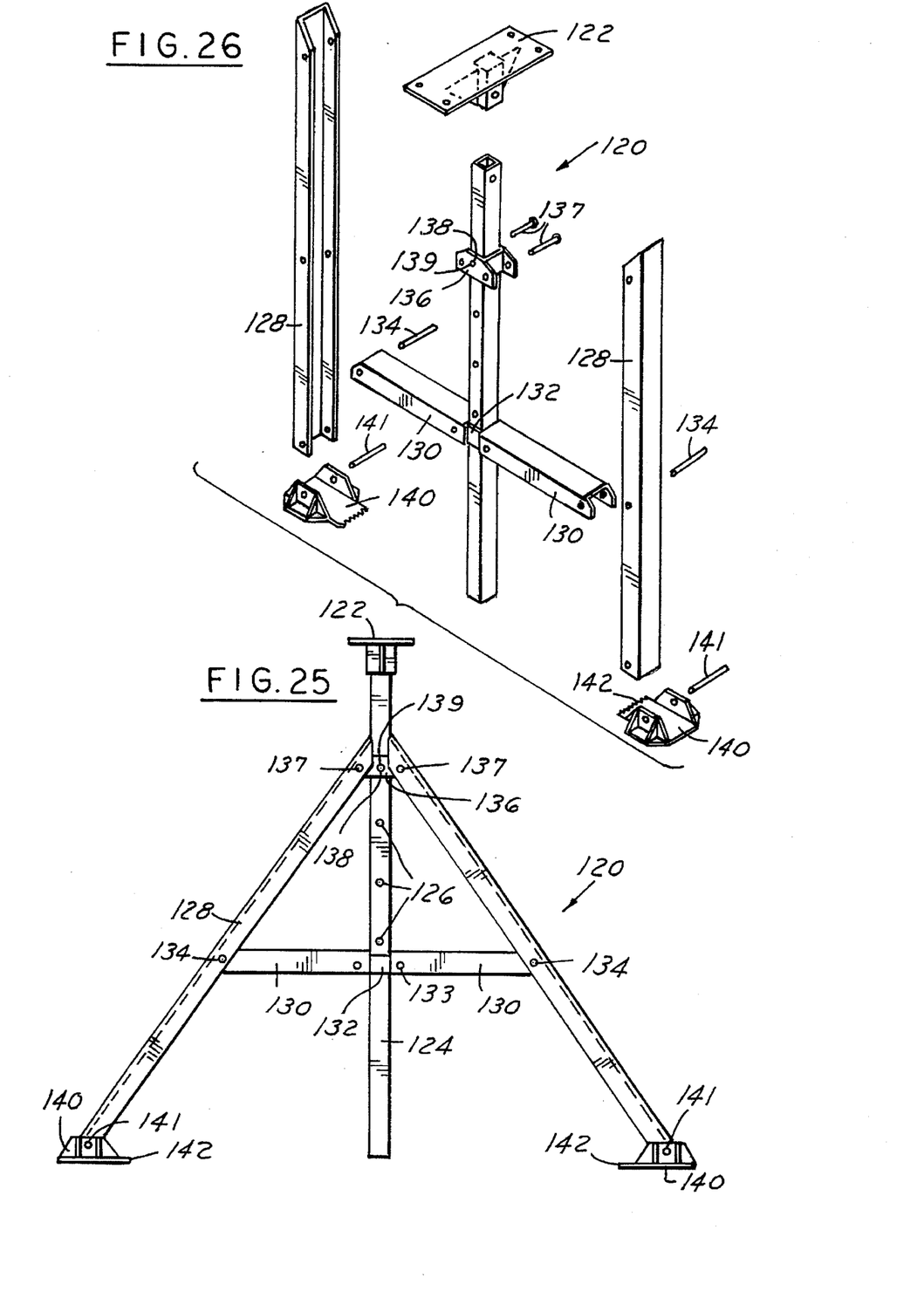
FIG. 25 is a front view of the adjustable leg assembly.
FIG. 26 is an exploded perspective view of the adjustable leg assembly.

Each leg 128 is provided with feet 140 hingedly connected thereto by pins 141. The feet 140 have serrated edges 142. The feet may be pivoted about the pins 141 such that the serrated edges 142 dig into the ground for a steadfast support.

It can thus be seen that there has been provided a portable saw table wherein a new plastic protractor and indexer plate with an angled magnifying sight lens to assist the user in viewing the adjustment angle are provided. An improved pivot mount supports the protractor for rotational movement. A gib is provided on the indexer plate for insuring smooth and pivotal movement. A hollow material stop for attachment to the portable saw table for accommodating workpieces of varying thickness. U-brackets secure the saw shoe plate to the saw slide and a saw stop prevents the saw slide from sliding past the ends of the tracks. Adjustable legs for the portable saw table provide adjustable yet steady support thereto.

We claim:

1. A portable saw table for a portable power saw comprising:
    a table base,
    a saw track pivotally mounted on said table base,
    pivot means on said table base for pivotally supporting said saw track on said table base,
    a saw slide for supporting the portable power saw slidably supported on said saw track,
    an indexer plate having a substantially arcuate edge fixedly mounted on said table base,
    a protractor having a substantially arcuate edge and a bottom face at the arcuate edge thereof fixedly mounted on said saw track beneath said indexer plate wherein the arcuate edge of said protractor is substantially adjacent the arcuate edge of said indexer plate, and
    a gib mounted on the arcuate edge of said indexer plate having a bearing surface extending beneath the bottom face at the arcuate edge of said protractor on which the bottom face moves during rotational movement of said protractor,
    said pivot means comprises
    a pivot mount,
    a hub portion on said indexer plate with a complementary recess for receiving said pivot mount, and
    an integral mounting portion on said protractor having a through bore complementary with said hub portion of said indexer plate for receiving said hub portion such that said protractor is rotatable relative to said indexer plate and said pivot mount,
    said pivot mount includes
    a plurality of solid lobes adapted to be received within the complementary recess in said hub portion of said indexer plate in a spline engagement.

2. A portable saw table as in claim 1 wherein said pivot mount comprises a depending skirt portion extending from said lobes.

3. A portable saw table as in claim 2 wherein said lobes are solid and said depending skirt portion is connected thereto by a plurality of radial walls.

4. A portable saw table as in claim 1 wherein said lobes have an outer periphery tapering downwardly and outwardly toward said skirt portion.

5. A portable saw table as in claim 1 comprising
    an extruded material stop,
    said material stop connected to said table base to extend thereacross and having a sloping upper surface and an abutment face for accommodating workpieces of different thickness.

6. A portable saw table as in claim 5 wherein said material stop extends at least four inches across said table base.

7. A portable saw table as in claim 1 including
    a spring biased saw stop on said saw track to limit movement of said saw track.

8. A portable saw table as in claim 1 comprising
    a saw shoe plate for supporting the portable saw,
    U-brackets mounted on said saw slide for holding said saw shoe plate to said saw slide wherein said U-brackets have one end for engaging said saw shoe plate and an opposite end for engaging said saw slide,
    means for holding said U-brackets in position.

9. A portable saw table as in claim 8 wherein said means for holding said U-brackets in position includes each said U-bracket having a slot therein,
    a bolt connected to said saw slide and received within the slot, and
    means for securing said U-bracket to said bolt where one end of the U-bracket rests on said saw slide and another end thereof rests on said saw shoe plate.

10. A portable saw table as in claim 9 wherein said means for securing said U-bracket comprises
    a nut threaded on said bolt.

11. A portable saw table as in claim 1 comprising
    an adjustable leg support assembly which comprises
    a vertical support,
    an attachment plate at one end of said vertical support for connection with said saw table base,
    a plurality of legs hingedly connected at one end to said vertical support,
    means for hingedly connecting the one end of said legs to said vertical support,
    horizontal brace means hingedly interconnecting said legs centrally thereof to said vertical support, and
    means for adjustment of said legs relative to said vertical support.

12. A portable saw table as in claim 11 wherein
    said vertical support has a plurality of openings along a length thereof,
    said means for hingedly connecting the one end of said legs to said vertical support comprises a clevis having an opening and slidable along the vertical support such that the openings in the clevis and said vertical support may be aligned, and a pull pin for insertion in the openings in the clevis and said vertical support when the openings in the clevis and said vertical support are aligned.

13. A portable saw table as in claim 11 including
feet means on each leg to provide steady support.

14. A portable saw table as in claim 11 including
at least of said two leg support assemblies provided at opposite ends of said saw table.

15. A portable saw table as in claim 14 including
a cross strut interconnecting each said leg support assembly, and a brace non-rotatably connected at one end to said saw track and pivotally connected at another end to said cross strut.

16. A portable saw table as in claim 15 including
a bracket on said cross strut, a hub means on said bracket for receiving the other end of said brace.

17. A portable saw table as in claim 16 wherein
said pivot mount has a first pivot axis, said hub means has a second pivot axis, and said first and second pivot axes are aligned.

18. A portable saw table as in claim 17 wherein said portable saw has a saw blade and when the saw blade is in a cross-cutting position, the saw blade lies in a plane which intersects said first pivot axis.

19. A portable saw table as in claim 1 wherein
said protractor comprises a flat upper surface and intersecting web sections extending from a bottom surface thereof to provide strength to said protractor and support thereto upon said saw track, and said indexer plate comprises a flat upper surface and web sections extending from a bottom surface thereof to provide strength to said indexer plate.

20. A portable saw table as in claim 1 including means for locking said saw track in an adjusted position to said table base.

21. A portable saw table as in claim 20 wherein said locking means comprises
a locking rod mounted within said table base, a spring mounted stop within said table base for engaging both said protractor and said indexer plate for preventing relative rotation therebetween, and means for releasing said stop to allow pivoting of said saw track relative to said table base.

22. A portable saw table as in claim 21 wherein said releasing means comprises
a locking rod sleeve through which said locking rod extends, a laterally extending projection on said locking rod sleeve, and an extension on said stop positioned substantially beneath said projection so that upon rotation of said locking rod, said projection of the locking rod sleeve engages said extension to move the stop against the spring to a release position.

23. A portable saw table as in claim 21 including additional locking means comprising
a split mounting block mounted on said pivot means and having a threaded opening to receive a threaded end of said locking rod so that the mounting block grips the pivot means as the locking rod is rotated to frictionally hold said saw track against rotation.

24. A portable saw table as in claim 23 wherein said gib includes a plurality of recesses each having a hexagonal cross section for receiving a hex nut, and a hole extending from each recess therethrough for receiving a bolt.

25. A portable saw table as in claim 24 wherein said indexer plate includes a plurality of openings therethrough for receiving a screw fastener adapted to extend through one of the recesses and one of the holes in said gib for threaded engagement with the hex nut for securing said gib to said indexer plate.

26. A portable saw table for a portable power saw comprising:
a table base, a saw track pivotally mounted on said table base, pivot means on said table base for pivotally supporting said saw track on said table base, a saw slide for supporting the portable power saw slidably supported on said saw track, an indexer plate having a substantially arcuate edge fixedly mounted on said table base, a protractor having a substantially arcuate edge and a bottom face at the arcuate edge thereof fixedly mounted on said saw track beneath said indexer plate wherein the arcuate edge of said protractor is substantially adjacent the arcuate edge of said indexer plate, and a gib mounted on the arcuate edge of said indexer plate having a bearing surface extending beneath the bottom face at the arcuate edge of said protractor on which the bottom face moves during rotational movement of said protractor, said pivot means comprises a pivot mount, a hub portion on said indexer plate with a complementary recess for receiving said pivot mount, and an integral mounting portion on said protractor having a through bore complementary with said hub portion of said indexer plate for receiving said hub portion such that said protractor is rotatable relative to said indexer plate and said pivot mount, said hub portion on said indexer plate has a conical outer surface, and a through bore in said integral mounting portion on said protractor having a complementary conical inner recess.

27. A portable saw table as in claim 26 including
a flat peripheral portion on said protractor having indicia thereon, and a flat window on said indexer plate for viewing the indicia.

28. A portable saw table as in claim 27 wherein the peripheral portion on said protractor having indicia thereon is angled with respect thereto, and the window on said indexer plate is angled with respect thereto for viewing the indicia on said protractor.

29. A portable saw table as in claim 28 wherein said window comprises means for magnifying the indicia for easy viewing.

30. A portable saw table for a portable power saw comprising:
a table base, a saw track pivotally mounted on said table base, pivot means on said table base for pivotally supporting said saw track on said table base, a saw slide for supporting the portable power saw slidably supported on said saw track, an indexer plate having a substantially arcuate edge fixedly mounted on said table base, a protractor having a substantially arcuate edge and a bottom face at the arcuate edge thereof fixedly mounted on said saw track beneath said indexer plate wherein the arcuate edge of said protractor is substantially adjacent the arcuate edge of said indexer plate, and a gib mounted on the arcuate edge of said indexer plate having a bearing surface extending beneath the bottom face at the arcuate edge of said protractor on which the bottom face moves during rotational movement of said protractor, said pivot means comprises a pivot mount, a hub portion on said indexer plate with a complementary recess for receiving said pivot mount, and said hub portion on said indexer plate has a recess with a hexagonal cross section for receiving a hex nut and a through opening extending from the recess for receiving a bolt.

31. A portable saw table as in claim 30 including a bolt adapted to extend through the through opening and the recess in said hub portion on said indexer plate for threaded engagement with the hex nut for securing said hub portion to said indexer plate.

32. A portable saw table as in any one of claims 1–31 wherein said indexer plate is made of plastic material, and said protractor is made of plastic material.

* * * * *